July 17, 1934. G. BASSO 1,967,141
POWER TRANSMISSION FOR BICYCLES AND THE LIKE
Filed Aug. 3, 1933  2 Sheets-Sheet 1

Inventor
Giovanni Basso
By Bryant & Lowry
Attorneys

July 17, 1934.  G. BASSO  1,967,141
POWER TRANSMISSION FOR BICYCLES AND THE LIKE
Filed Aug. 3, 1933   2 Sheets-Sheet 2
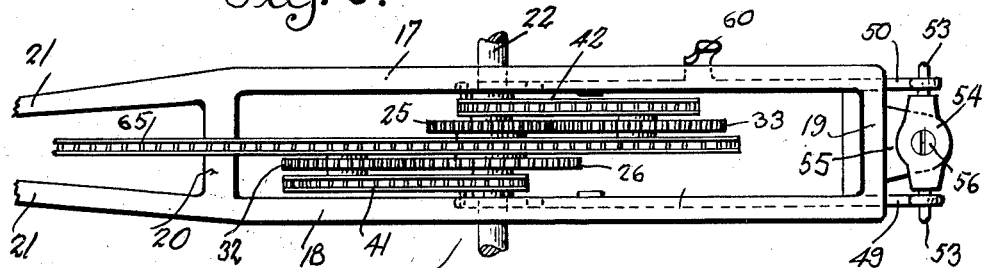
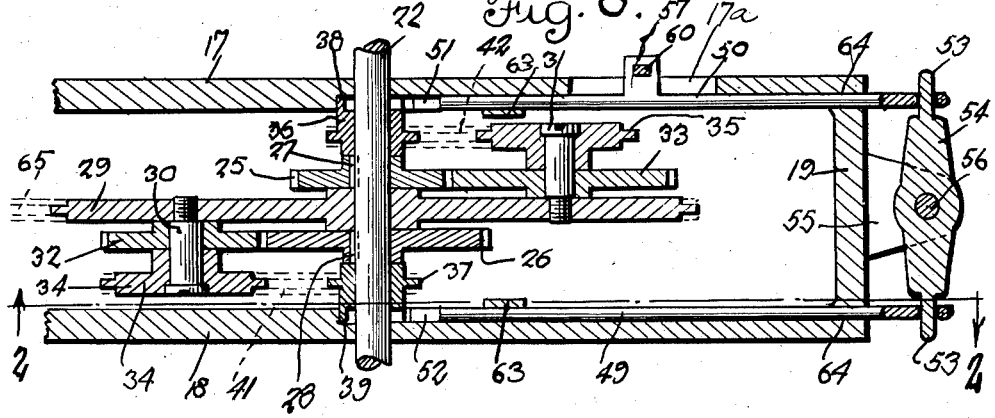
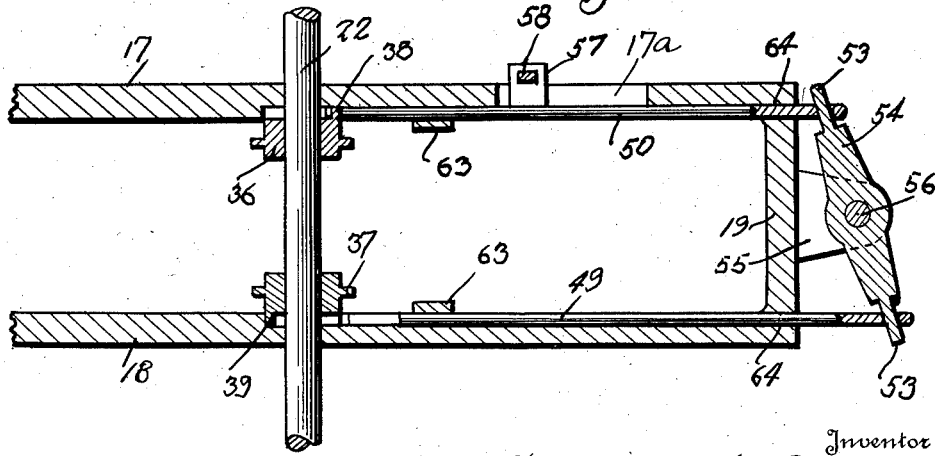
Inventor
Giovanni Basso.
By Bryant & Lowry
Attorney Patented July 17, 1934

1,967,141

UNITED STATES PATENT OFFICE 1,967,141

POWER TRANSMISSION FOR BICYCLES AND THE LIKE

Giovanni Basso, Welch, W. Va., assignor of one-third to Erminio Boschian, War, W. Va., and one-third to Angelo Basso, Welch, W. Va.

Application August 3, 1933, Serial No. 683,554

8 Claims. (Cl. 208—74)

This invention relates to improvements in power transmission devices of the planetary type particularly adapted for bicycle propulsion systems but which is obviously applicable to other forms of self-propelled vehicles.

The primary object of this invention is to provide a device of the above mentioned character adapted to provide two speeds which may be selectively employed for propelling the vehicle up hills with ease and on level roadways with more speed than has heretofore been accomplished.

A further object of this invention is to provide two sets of driven gear wheels operated by two separate drive wheels connected to the crank shaft which may be selectively thrown into operation to effect a change of speed and ratio gearing by means of a single control lever conveniently located within the reach of the operator, for vehicles of any character.

A still further object of this invention is to provide a unique framework for supporting the planetary gearing which also forms a guard for preventing the operator's clothes from becoming entangled in said planetary gearing.

A still further object of this invention is to provide a novel form of change speed selector including selectively reciprocable rods adapted to be moved into engagement with freely rotatable sprocket wheels to prevent their rotation selectively and effect a change in the planetary gear ratio.

A still further object of this invention is to provide a planetary gearing propulsion system for self-propelled vehicles including two sets of gearing, one of which may be employed for increasing power and the other which may be employed for increasing speed.

Other objects and advantages of the invention will become apparent during the course of the following description, taken with the drawings, wherein, Figure 1 is a side elevational view illustrating the invention as applied to a bicycle;

Figure 5 is an enlarged fragmentary top elevational view of the frame illustrating the gearing mounted therein;

Figure 1:
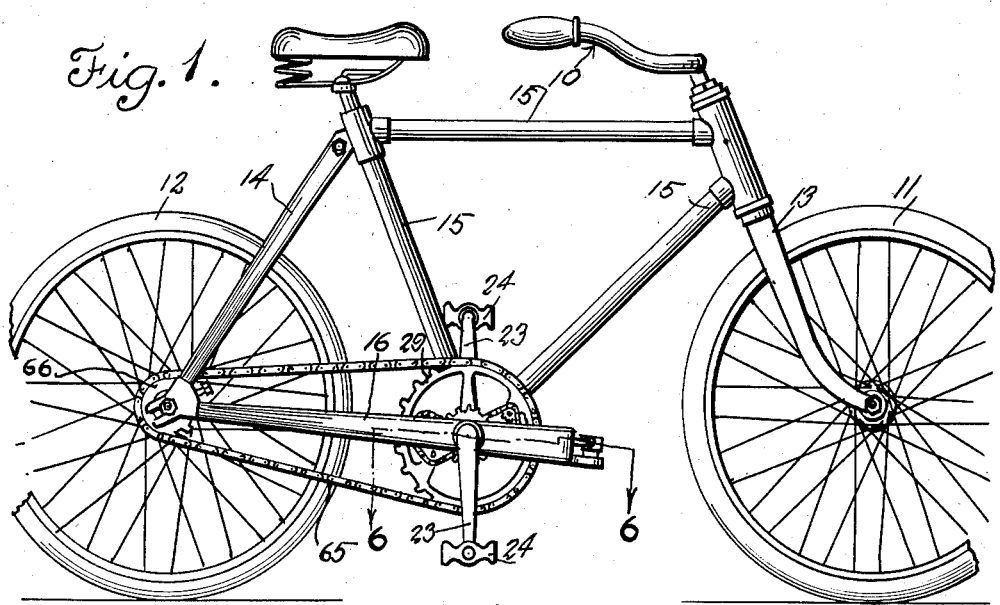
Figure 2:
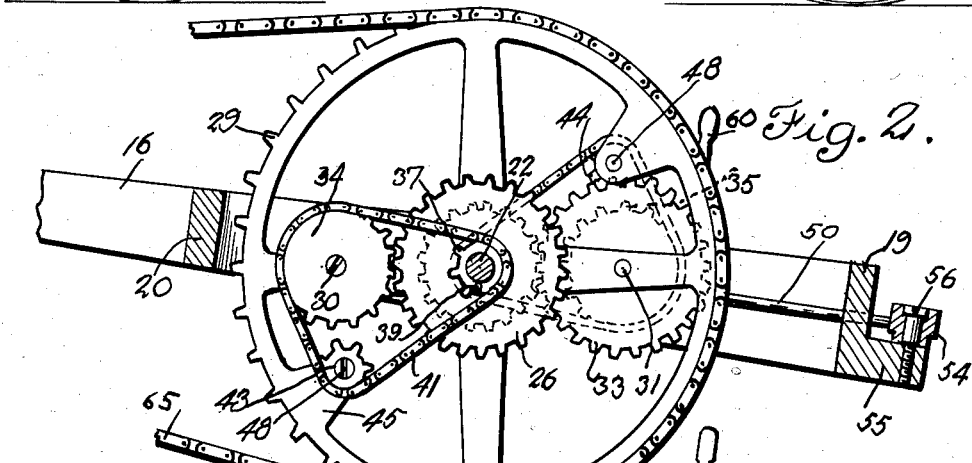
Figure 2 is a vertical cross-sectional view taken on line 2—2 of Figure 6, looking in the direction of the arrows, illustrating the two sets of planetary gears.
Figure 3:
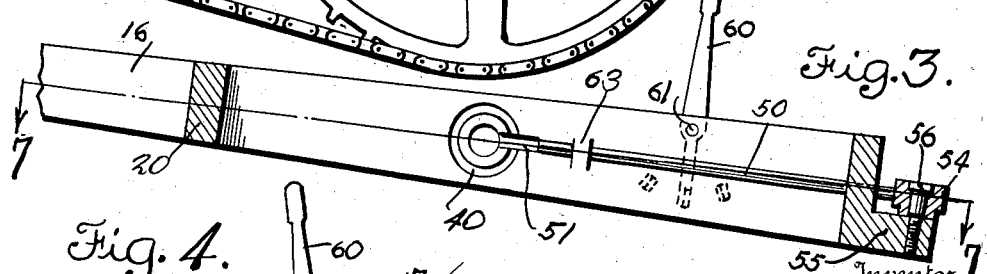
Figure 3 is a vertical longitudinal cross-sectional view through the supporting frame showing one of the clutch rods and the operating lever therefor.
Figure 4:
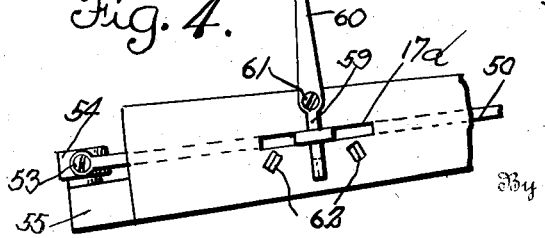
Figure 4 is an enlarged fragmentary view of the frame further illustrating the connection between the clutch selecting lever and the operating rods associated therewith.

Figure 6 is an enlarged horizontal cross-sectional view taken on line 6—6 of Figure 1, looking in the direction of the arrows, illustrating in detail the arrangement of the planetary gear sets; and Figure 7 is a horizontal cross-sectional view taken on line 7—7 of Figure 3, looking in the direction of the arrows, showing the shifter for the clutch rod and the manner in which the ends thereof are moved into engagement with normally rotatable sprocket wheels to lock the same against movement and effect the change of gear speed.

In the drawings, wherein for the purpose of illustrating the invention and wherein like reference characters will be employed to designate like parts throughout the same, the reference character 10 will generally be employed to designate the bicycle frame having front and rear wheels 11 and 12 respectively carried by forks 13 and 14 connected to the triangular frame 15.

The connecting frame 16 is modified and includes side frame members 17 and 18 connected at the front portion by means of a transverse frame bar 19 and braced adjacent the rear by means of a transverse cross-bar 20. The rear free ends of the forks 21 of the frame member 16 pass on opposite sides of the rear wheel 12 and are connected to the rear portion of the rear fork 14 in the usual manner.

Transversely mounted in the frame between the side bars 17 and 18, is a loosely mounted crank shaft 22 having crank arms 23 provided on the outer ends with pedals 24. A sprocket wheel 29 is freely rotatable upon the crank shaft 22 intermediate its ends and driven gears 25 and 26 are respectively mounted on the shaft 22 at opposite sides of the sprocket wheel 29, being keyed to the shaft as at 27 and 28 in proximity of the sprocket wheel.

The sprocket wheel 29 is provided at diametrically opposite points inwardly of the peripheral edge with stub shafts 30 and 31 respectively projecting from opposite faces of the sprocket wheel and upon which are rotatably mounted driven gears 32 and 33 respectively engaged with the driven gears 26 and 25.

The stub shafts 30 and 31 are respectively provided with sprocket wheels 34 and 35 and said sprocket wheels are rigidly connected with the associated gears 32 and 33.

Loosely mounted on the crank shaft 22 adjacent the side frame bars 17 and 18 and outwardly of the gears 25 and 26 are smaller sprocket wheels 36 and 37, each having a pin on the outer face thereof as at 38 and 39 respectively adapted to be received in the adjacent annular groove 40 in the adjacent frame bar 17 or 18 as shown clearly in Figure 3. Sprocket chains 41 and 42 are respectively passed around the sprocket wheels 34—37 and 36—35. Idler sprocket wheels 43 and 44 are respectively traversed by the sprocket chains 41 and 42, being located at diametrically opposite points on pins 48 carried by the sprocket wheel 29.

Clutch rods 49 and 50 are respectively longitudinally slidably mounted on the inner sides of the frame members 18 and 17 and have the free rear ends thereof movable in guideways 51 and 52 for entering the annular grooves 40 where they may be moved into engagement alternately with the pins 38 and 39 carried by the respective sprocket wheels 36 and 37. The forward ends of the clutch rods 49 and 50 are provided with openings for receiving opposite ends 53 of a rock lever 54 pivoted as at 56 on a bracket 55 projecting forwardly of the cross bar 19 of the frame 16.

A laterally projecting lug 57 is carried by the clutch rod 50 and projects through a slotted opening 17a in the frame member 17. The lug 17 is provided with an opening 58 for receiving the lower end 59 of a gear selector lever 60 pivoted as at 61 to the side frame 17. Stops 62 are provided for limiting the movement of the selector lever 50 so that the selector may be moved to alternately operate the clutch bars 49 and 50. It will be noted that the clutch bars 49 and 50 operate in grooves 51 and 52 and are held in place by means of straps 63 and by reason of the fact that the clutch rods 49 and 50 extend through openings 64 formed in the transverse frame bar 19.

Passing around the loosely mounted sprocket wheel 29 is a driven sprocket chain 65 which extends around the usual wheel sprocket 66 carried by the conventional bicycle clutch and brake.

It will be noted that the gear wheel 25 secured to the crank shaft 22 is of a relatively smaller diameter than the gear wheel 26 also secured to the crank shaft 22 and also that the meshing gear wheels 32 and 33 are relatively smaller and larger. By moving the selector lever 60 so that the clutch rod 50 moves into engagement with the pin 38 on the sprocket wheel 36, the sprocket wheel will be locked to the frame whereupon rotation of the crank shaft 22 will rotate the gear wheel 25 which will drive the driven gear 33 and consequently rotate the sprocket wheel 35. Since the sprocket wheel 36 is held stationary, the sprocket wheel 35 will turn around the sprocket wheel 36 and thereby effect the rotation of the sprocket wheel 29 and the drive of the rear wheel 12. When the gears are in the above described operation, the power will be increased double by reason of the fact that the gear 25 is smaller than the gear 33 and therefore the shaft 22 will rotate slightly faster than the sprocket wheel 29, and by changing the ratio of the gears the power may be stepped up as desired.

If the selector lever 60 is shifted to move the clutch rod 49 into engagement with the projection or pin 39 on the sprocket wheel 37, the aforementioned gearing will become inoperative and the drive will then be through the crank shaft 22, enlarged driven wheel 26 and smaller driving wheel 32 which will cause the crank shaft 22 to be rotated slowly in proportion to the speed of the sprocket wheel 29 whereby more speed is produced without as many revolutions to the shaft 22.

By moving the selector lever 60 to the position shown in Figure 6, the sprocket wheel 29 and crank shaft 22 will be disconnected and the crank shaft may be rotated without applying power or rotation to the sprocket wheel 29.

It is to be understood that the frame bars 15 may be connected to the gear frame bars 17 and 18 in any suitable manner such as by riveting or welding the same to the side bar 17 at a point close to the crank shaft 22.

It is also to be understood that the form of the invention herewith shown and described is to be taken as the preferred embodiment of the invention and that various changes in the shape, size and arrangement of parts may be resorted to without departing from the spirit and scope of the invention as claimed.

I claim:—

1. A change speed gearing comprising a crank shaft, a transmitting sprocket wheel loosely mounted on said shaft, a drive gear wheel rigidly secured to the crank shaft, a transverse shaft secured to the transmitting sprocket wheel, a spur gear loosely mounted on the transverse shaft, a sprocket wheel secured to the spur gear, a second sprocket wheel loosely mounted on the crank shaft, a sprocket chain passing over the spur gear sprocket wheel and second sprocket wheel, and means for preventing rotation of the second sprocket wheel comprising a sliding rod adapted to be moved into the path of a projection formed on the second sprocket wheel.

2. A change speed gearing comprising a crank shaft, a transmitting sprocket wheel loosely carried by said crank shaft, a pair of oppositely positioned transverse pins mounted on the transmitting sprocket wheel shaft, a drive gear on opposite sides of the transmitting sprocket wheel rigidly secured to the crank shaft, a spur gear loosely mounted on each of the transverse pins adapted to mesh with the drive gears, sprocket wheels, carried by the spur gears, a second sprocket wheel located one side of each of the drive gear wheels, a sprocket chain passing over the second sprocket wheels and spur gear sprocket wheels and means for alternately preventing rotation of the second sprocket wheels.

3. In a change speed gearing of the character described, a crank shaft, a sprocket wheel loose on the crank shaft, a power transmission train at each side of the sprocket wheel including a gear keyed to the crank shaft, a gear and sprocket wheel fixed together and freely rotatable on a side face of the sprocket wheel, and a sprocket wheel loose on the crank shaft having a chain connection with the aforesaid sprocket wheel, and means for holding either sprocket wheel on the shaft against rotation whereby power imparted to either power transmission train is transmitted to the sprocket wheel.

4. In a change speed gearing of the character described, a crank shaft, a sprocket wheel loose on the crank shaft, a power transmission train at each side of the sprocket wheel including a gear keyed to the crank shaft, a gear and sprocket wheel fixed together and freely rotatable on a side face of the sprocket wheel, and a sprocket wheel loose on the crank shaft having a chain connection with the aforesaid sprocket wheel, means for holding either sprocket wheel on the shaft against rotation whereby power imparted to either power transmission train is transmitted to the sprocket wheel, and said power transmission trains having different gear ratios for different driving speeds.

5. In a change speed gearing of the character described, a crank shaft, a sprocket wheel loose on the crank shaft, a power transmission train at each side of the sprocket wheel including a gear keyed to the crank shaft, a gear and sprocket wheel fixed together and freely rotatable on a side face of the sprocket wheel, and a sprocket wheel loose on the crank shaft having a chain connection with the aforesaid sprocket wheel, means for holding either sprocket wheel on the shaft against rotation whereby power imparted to either power transmission train is transmitted to the sprocket wheel, the means for holding the shaft supported sprocket wheels from rotation including a pin facially projecting from the sprocket wheel and manually operable clutch rods slidable into the path of movement of the pin.

6. In a change speed gearing of the character described, a crank shaft, a sprocket wheel loose on the crank shaft, a power transmission train at each side of the sprocket wheel including a gear keyed to the crank shaft, a gear and sprocket wheel fixed together and freely rotatable on a side face of the sprocket wheel, and a sprocket wheel loose on the crank shaft having a chain connection with the aforesaid sprocket wheel, means for holding either sprocket wheel on the shaft against rotation whereby power imparted to either power transmission train is transmitted to the sprocket wheel, said power transmission trains having different gear ratios for different driving speeds, the means for holding the shaft supported sprocket wheels from rotation including a pin facially projecting from the sprocket wheel and manually operable clutch rods slidable into the path of movement of the pin.

7. In a change speed gearing of the character described, a crank shaft, a sprocket wheel loose on the crank shaft, a power transmission train at each side of the sprocket wheel including a gear keyed to the crank shaft, a gear and sprocket wheel fixed together and freely rotatable on a side face of the sprocket wheel, and a sprocket wheel loose on the crank shaft having a chain connection with the aforesaid sprocket wheel, means for holding either sprocket wheel on the shaft against rotation whereby power imparted to either power transmission train is transmitted to the sprocket wheel, the means for holding the shaft supported sprocket wheels from rotation including a pin facially projecting from the sprocket wheel and manually operable clutch rods slidable into the path of movement of the pin, a rock lever to which the clutch rods are attached and an operating lever engaged with one of the clutch rods.

8. In a change speed gearing of the character described, a crank shaft, a sprocket wheel loose on the crank shaft, a power transmission train at each side of the sprocket wheel including a gear keyed to the crank shaft, a gear and sprocket wheel fixed together and freely rotatable on a side face of the sprocket wheel, and a sprocket wheel loose on the crank shaft having a chain connection with the aforesaid sprocket wheel, means for holding either sprocket wheel on the shaft against rotation whereby power imparted to either power transmission train is transmitted to the sprocket wheel, said power transmission trains having different gear ratios for different driving speeds, the means for holding the shaft supported sprocket wheels from rotation including a pin facially projecting from the sprocket wheel and manually operable clutch rods slidable into the path of movement of the pin, a rock lever to which the clutch rods are attached and an operating lever engaged with one of the clutch rods,

GIOVANNI BASSO.